Nov. 7, 1939.　　　　F. W. SEECK　　　　2,178,613
DIFFERENTIAL MECHANISM
Filed Dec. 6, 1937　　　　3 Sheets-Sheet 1
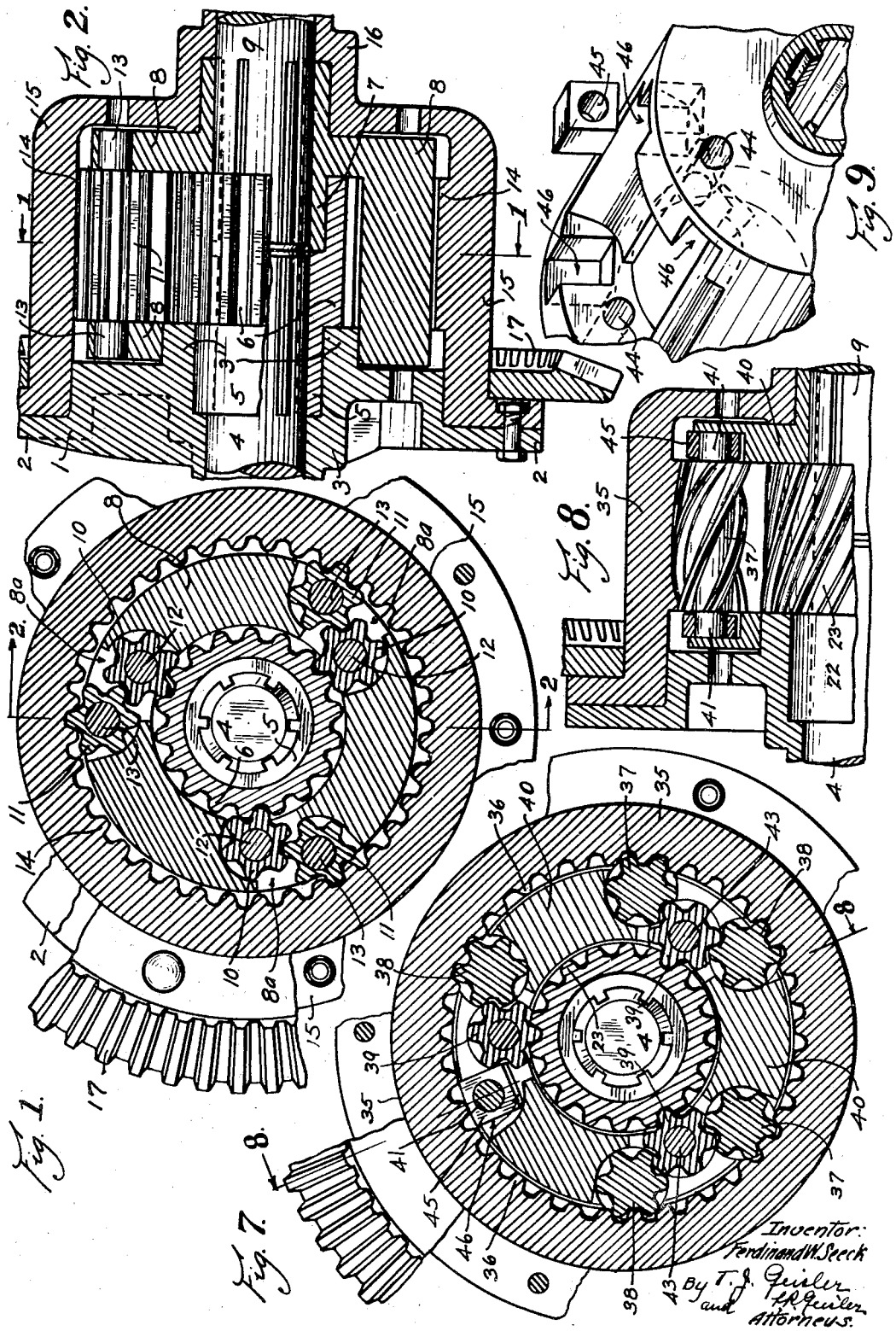

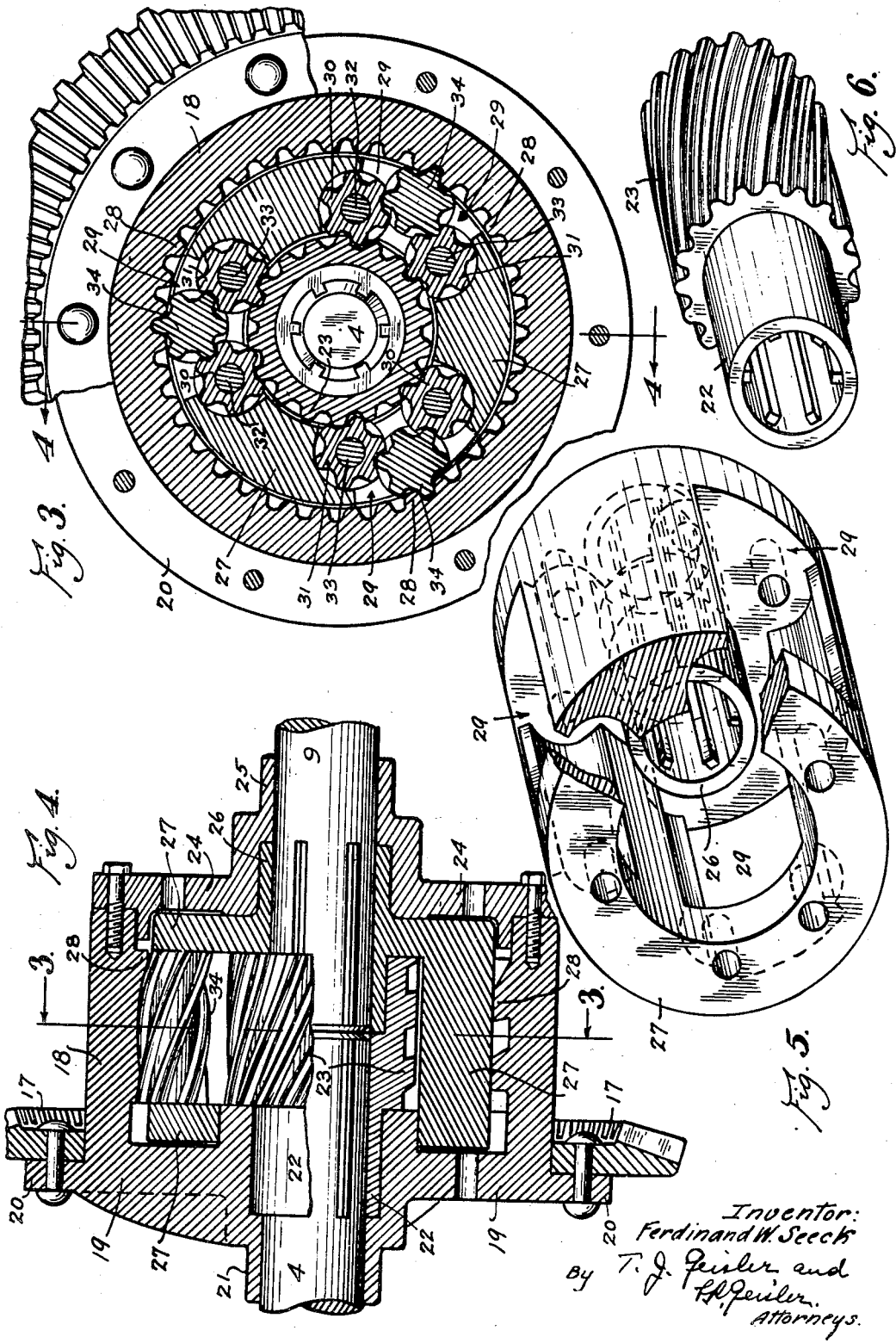

Nov. 7, 1939.  F. W. SEECK  2,178,613

DIFFERENTIAL MECHANISM

Filed Dec. 6, 1937  3 Sheets—Sheet 3

Patented Nov. 7, 1939

2,178,613

UNITED STATES PATENT OFFICE 2,178,613

DIFFERENTIAL MECHANISM

Ferdinand W. Seeck, Lebanon, Oreg.

Application December 6, 1937, Serial No. 178,287

16 Claims. (Cl. 74—313)

My invention relates to differential mechanisms of the type used in automotive vehicles to compensate for the relative difference in the rotational speeds of the rear or propelling wheels, as when turning a corner, and, under such conditions, to divide equally the driving power of the engine shaft and transmit it to the axles of the respective vehicle wheels.

As is well known, the differential mechanisms most commonly used include bevel gears, and while various improvements in the form and construction of such bevel gear differentials have been made, these bevel gear differentials all have certain definite limitations, so that it has been impossible thus far, regardless of the various improvements, to attain certain desired results.

I have discovered that greater possibilities for a perfect differential are offered by eliminating bevel gears entirely and constructing a differential in which planet pinion gears are substituted in place thereof.

The principal object of my invention is to provide a practical, efficient differential which will cause the most power to be applied to the wheel which has the greatest traction. I have found that this is best obtained with spur gears of the planet type instead of bevel gears.

Another object of my invention is to provide a differential which is stronger than but which nevertheless will constitute as compact a unit as the ordinary differential in which bevel gears are used. This I find possible to accomplish with planet pinion gears which can be made comparatively long and thereby afford greater tooth contact.

The differential mechanisms heretofore used in conventional automotive vehicles perform their function of equalizing and transmitting power to the propelling wheels whenever the resistance to rotation of one wheel exceeds the resistance to rotation of the other wheel. This equal division of power, while it enables one wheel to rotate faster than the other when the vehicle is turning a corner, is not desirable when the tractive power of the wheels is not equal because, under this latter condition, the wheel which stands on a dry road surface with maximum traction can exert no more propelling effort than the wheel on slippery ground. Consequently, the vehicle in such a situation becomes stalled since the effective rotative force follows the path of least resistance and spins the slipping wheel.

An object of my invention is to provide a differential mechanism which will equally divide the power transmitted to the wheels under ordinary conditions and yet, under abnormal road surface conditions, when the traction becomes unequal, will operate to divide the transmitted power in such manner that the wheel having the most traction or road grip will receive more rotative power than the other wheel. The manner in which I attain the above mentioned and incidental objects by the use of pinion gears in a semi-planetary arrangement, and by other improved differential construction will now be described with reference to the accompanying drawings.

In the drawings:

Fig. 1 is a sectional elevation on the line 1—1 of Fig. 2 illustrating a simple embodiment of my invention;

Fig. 2 is a transverse sectional elevation on the line 2—2 of Fig. 1 and corresponding thereto;

Fig. 3 is a sectional elevation on the line 3—3 of Fig. 4 showing a further embodiment of the principles of my invention;

Fig. 4 is a transverse sectional elevation on the line 4—4 of Fig. 3 and corresponding thereto;

Fig. 5 is a perspective view of the planet pinion gear carrying member which also constitutes the driving element for one of the wheel axles, which member is incorporated in the construction shown in Fig. 4;

Fig. 6 is a perspective view of the other axle driving element also shown in Fig. 4;

Fig. 7 is a sectional elevation corresponding to Fig. 3 but showing a slight modification in construction;

Fig. 8 is a fragmentary transverse sectional elevation on the line 8—8 of Fig. 7;

Fig. 9 is a fragmentary perspective view of the pinion gear carrying member shown in Fig. 7;

Figure 10:
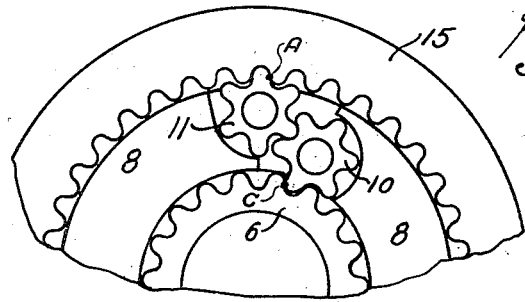
Figure 10A:
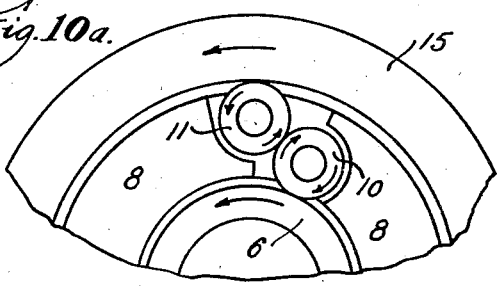
Figure 10B:
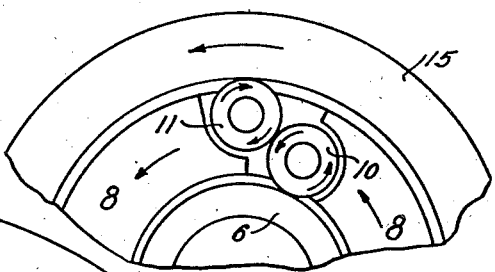
Figure 11A:
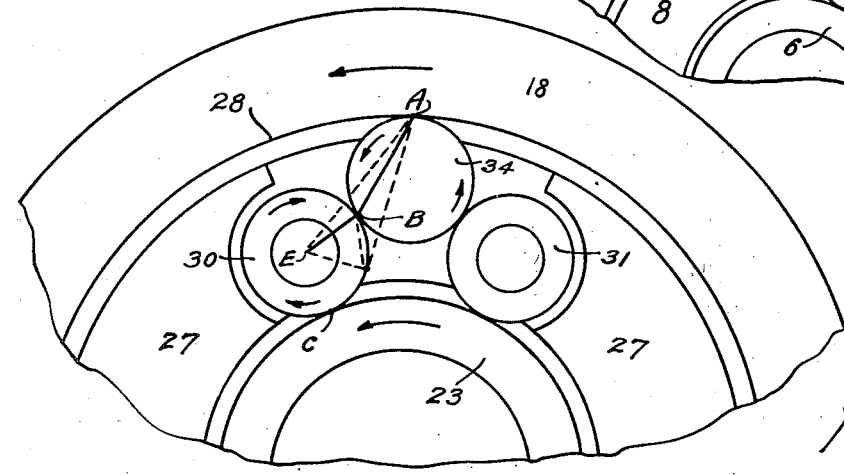
Figure 11B:
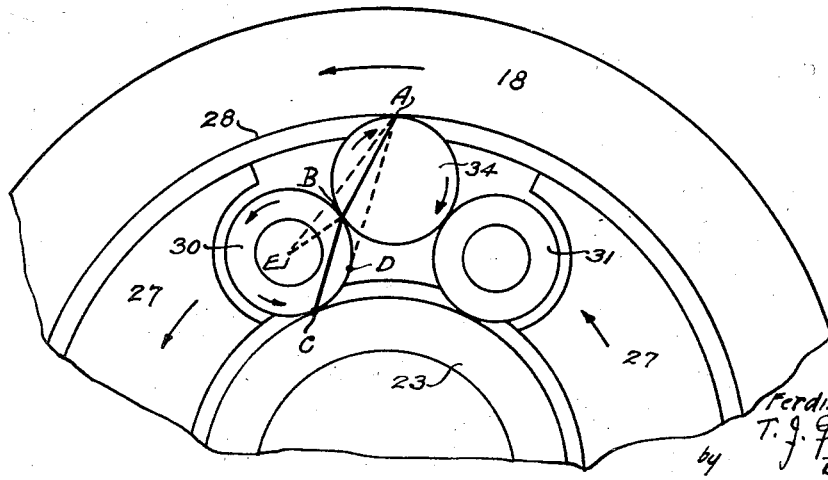

Figs. 10, 10a and 10b are explanatory diagrams illustrating the operation of the parts of my differential shown in Figs. 1 and 2; and Figs. 11a and 11b are explanatory diagrams of the operation of the embodiment of my invention illustrated in Figs. 3 and 4 and illustrating the direction of the forces exerted in the use of this embodiment.

Referring first to the embodiment of my invention illustrated in Figs. 1 and 2, an end plate 1 (Fig. 2), formed with an integral peripheral shouldered flange 2 and a central hub 3, is journaled for free rotation on the concentric axle shaft 4 and on the sleeve-like extension 5 of a spur-gear 6, the stepped bore of the hub 3 providing the necessary bearing surfaces. The spur-gear 6, which is similar in general form to the helical gear shown in Fig. 6, is bored and splined to receive the correspondingly splined end of the axle shaft 4, this conventional method of mounting such gears permitting the axle shaft to be withdrawn for repair or replacement without dismantling the differential assembly and also serving to prevent rotation of the said gear 6 with respect to the axle shaft 4. As apparent in Fig. 2, the toothed rim of the spur-gear 6 extends beyond the extremity of the axle shaft 4 and is bored to receive the concentric hub 7 of a cylindrical cup-shaped, pinion-carrying member 8, the hub 7 being splined to receive the correspondingly splined end of an axle shaft 9 in axial alignment with the shaft 4. The body of the cup-shaped pinion-carrying member 8 is bored to a slightly larger diameter than the overall diameter of the spur-gear 6 disposed therein and is rotatably mounted on the inward extension 3' of the hub 3 of the end plate 1. The shape of member 8 is shown in general in Fig. 5. Disposed in suitable apertures 8a (Fig. 1), provided in the comparatively thick shell of the hollow body of the member 8 are three sets of pinion gears symmetrically arranged in semi-planetary formation about the spur-gear 6 substantially as shown in Fig. 1, each set comprising two identical pinions 10 and 11 having stub shafts 12 and 13, respectively, journaled in the said shell of the member 8. The teeth of the three pinions 10 mesh with the teeth of the spur-gear 6 and with the teeth of the identical pinions 11. The teeth of the latter in turn mesh with the similar teeth of an internal gear 14 formed on the interior of a cup-shaped differential housing 15. Thus the teeth of internal gear 14, pinions 10 and 11, and spur-gear 6 are necessarily identical in size and shape. The diameter of the pitch circle of the internal gear 14 is made twice that of the spur-gear 6, and, consequently, has twice as many teeth.

The hub 16 of the cup-shaped housing 15 (see Fig. 2) is provided with a central stepped bore adapted to receive the external end of hub 7 of the member 8, and also the axle shaft 9 in such manner that the housing 15 may rotate freely thereon and constitute a complete casing for the entire differential mechanism when firmly secured, by means of bolts or other fasteners, to the flange 2 of the end plate 1. Thus the housing 15 and its attached end plate 1, may be freely rotated on the axle shafts 4 and 9, and the member 8, keyed to the axle shaft 9, is rotatable on the spur-gear 6, keyed to the axle shaft 4. The entire housing comprising the two portions 1 and 15 is rotated as a unit by means of a ring gear 17, firmly secured to the flange 2, and a suitable pinion (not shown) mounted on the drive shaft connected with the vehicle motor.

The operation of the embodiment of my invention shown in Figs. 1 and 2 will now be described. For the purpose of this description the entire range of conditions under which the differential in the vehicle operates will be resolved into three cases as follows:

Case 1, when the resistance of both wheels is equal;

Case 2, when the resistance of the right wheel (mounted on the axle 9) exceeds that of the left wheel (mounted on the axle 4); and Case 3, when the resistance of the left wheel exceeds that of the right.

Case 1.—Referring to the diagrammatic drawings Fig. 10, it will be seen that rotation in a counter-clockwise direction of the housing 15 has a tendency to cause the rotation also in a counter-clockwise direction of the pinion 11 and in the opposite direction of the pinion 10. The rotative force applied on pinion 11 at A equals (approximately) the rotative force applied by pinion 10 on spur-gear 6 at the point C. The rotative power applied at point A on member 8 would ordinarily be twice the rotative power applied at point C on spur-gear 6 due to the fact that point A is approximately twice the distance of point C from the center of the axis of rotation of housing 15, member 8 and spur-gear 6; but the power at point A is divided and one-half of this force acts as a tendency to rotate member 8 in a counter-clockwise direction and one-half, acting thru the medium of the pinions 11 and 10, is exerted at C in the form of a tendency to rotate spur-gear 6 in a counter-clockwise direction. Since both member 8 and spur-gear 6 offer the same resistance, these tendencies are balanced, and as a result both member 8 and spur-gear 6 are driven in unison in the same direction and at the same speed as the housing 15, the pinions 11 and 10 being held against rotation. The entire differential under such condition operates as a unit, and as a result both wheels of the vehicle turn at the same speed and in the same direction. The result obtained in this case, therefore, is precisely the same as that obtained with the conventional bevel gear differential.

Case 2.—In this case the resistance imposed by the right hand wheel on member 8 exceeds the resistance imposed by the left hand wheel on spur-gear 6. Referring to the diagrammatic drawing Fig. 10a, let it be assumed that the extreme condition prevails, that is, that the resistance to rotation of the right wheel is sufficiently greater than that of the left wheel so that the member 8 is held stationary. Counter-clockwise rotation of the housing 15, as before, imparts rotary motion in a counter-clockwise direction to the pinion 11 and in clockwise direction to the pinion 10, and the latter in turn imparts rotary motion in counter-clockwise direcion to the spur-gear 6. Thus the spur-gear 6 rotates in the same direction as the housing 15, while the member 8 remains stationary. But, because of the fact that the internal gear of the housing 15 has double the number of teeth of the spur-gear 6, the latter will be rotated at exactly twice the speed of the housing 15.

Case 3.—In this case the resistance imposed on spur-gear 6 by the left wheel is assumed to be sufficiently greater than that imposed by the right wheel on member 8 so that the spur-gear 6 remains stationary. Referring to diagrammatic drawing Fig. 10b, the action of the differential under this condition is as follows: Counter-clockwise rotation of the housing 15 will impart clockwise rotation to the pinion 11, and counter-clockwise rotation to the pinion 10. Since the spur-gear 6 is restrained from rotation, the rotation of pinion 10 counter-clockwise forces member 8 to rotate counter-clockwise, that is in the same direction as the housing 15. And since the number of teeth on the internal gear of housing 15 is twice the number on the stationary spur-gear 6, in this case member 8 will be rotated in the same direction as housing 15 and exactly at twice the speed.

In the description of the operation of the differential mechanism in these three cases, the housing 15, constituting the driving member, has been described as rotating counter-clockwise, but it is to be understood that correspondingly similar results are obtained when the housing rotates in the opposite direction, the several members being merely driven in reverse direction to that explained in Cases 1, 2 and 3. The rotation of member 8 and/or spur-gear 6 in these cases is always in the same direction as that of the driving member or housing 15.

From the above three cases the following general observations are to be made regarding the operation of my differential, provided, of course, that the number of teeth on the internal gear of the housing 15 is always exactly twice the number of teeth on the spur-gear 6:—when the resistance offered by both wheels is equal, both will be driven at the same rate of speed and in the same direction; when the resistance offered by one wheel increases the speed of that wheel decreases and the speed of the other increases accordingly until, when the resistance of one wheel becomes sufficiently greater than that of the other, the first mentioned wheel will remain stationary while the other wheel will be driven at twice the speed of the housing or driving member. The speed of the latter, however, can never be more than twice that of the driving member or housing, and it will be found in this specific construction that the sum of the speeds of spur-gear 6 and member 8 will always equal twice the speed of the driving member 15 regardless of the variation in resistance offered by the two vehicle wheels.

A further case should be considered at this point, namely, the result obtained when the housing 15 is held stationary and one of the vehicle wheels is rotated. Referring to Fig. 10, let it be assumed that the housing 15 is kept stationary while member 8 is rotated in a counter-clockwise direction. It is desired to ascertain what effect is produced on spur-gear 6. Assuming that member 8 rotates in counter-clockwise direction a distance of the arc measured by the space of two teeth on the internal gear 14, it is obvious that the pinion 11 will be rotated in clockwise direction for a distance of two teeth. Pinion 11 in turn will cause pinion 10 to rotate an equal distance in a counter-clockwise direction, which has a tendency to cause pinion 10 to travel in a counter-clockwise direction on spur-gear 6. But, since the angle through which member 8 has rotated is measured by the arc corresponding to two teeth on gear 14 and the same angle is measured by an arc corresponding to one tooth on spur-gear 6, (the former being twice the diameter of the latter and consequently having twice as many teeth, as previously specified), rotation of member 8 in a counter-clockwise direction through an angle measured by the arc corresponding to two teeth on gear 14 would be rotation through an arc measured by one tooth on spur-gear 6. However, during this partial rotation of member 8 the pinion 11 and consequently pinion 10 are rotated to the extent of two of their peripheral teeth. In other words, pinion 10 must rotate on spur-gear 6 sufficiently to cause two of its teeth successively to mesh with the similar teeth on spur-gear 6. But since the travel of member 8 is sufficient to take up the distance of only one tooth on spur-gear 6, and pinion 10 is obliged during that period to mesh successively with two teeth on spur-gear 6, the pinion 10 forces the spur-gear 6 to turn in the opposite or clockwise direction to the extent of one tooth. Thus when member 8 rotates counter-clockwise a distance corresponding to two teeth on gear 14, spur-gear 6 is forced to rotate in the opposite direction a distance of one tooth on spur-gear 6. In other words, when member 8 moves in one direction (the housing 15 being held stationary) spur-gear 6 is driven in the opposite direction at the same speed. Similarly, it would be shown that when spur-gear 6 rotates in one direction (the housing 15 being held stationary) member 8 is driven at the same speed in the opposite direction.

Thus all the functions of an ordinary bevel gear differential are performed by my differential having planet pinion gears.

The modification of my invention illustrated in Figs. 3 and 4 will now be described. A cup-shaped, cylindrical housing 18 (Fig. 4) is formed with an integral end plate 19 and peripheral flange 20 to which is firmly secured the conventional ring gear 17 or other suitable means for transmitting rotary motion to the housing 18. The end plate 19 is provided with a hub 21 having a central stepped bore adapted to receive and be freely rotatable on the left wheel axle shaft 4 and on the tubular extension 22 of a helical spur-gear 23. This spur-gear is shown separately in Fig. 6. The interior surface of the tubular extension 22 is formed with integral splines which cooperate with the splined end of the axle shaft 4 to provide a slideable but non-rotatable mounting for the spur-gear 23 on the said axle shaft 4. The spur-gear 23 is thus keyed, so to speak, to the axle shaft 4 and the housing 18 is freely rotatable thereon. An end plate 24 is removably secured to the housing 18 and has a hub 25 bored to two diameters in similar manner to the hub 21 of the opposite end section 19, and is freely rotatable on the right wheel axle shaft 9 and on the hub 26 of the cup-shaped pinion carrying member 27, which is also shown in Fig. 5. The hub 26 of member 27 is splined to slideably receive the correspondingly splined end of the said axle shaft 9 in alignment with the axle shaft 4. The inner end of hub 26 also constitutes a bearing surface for that portion of the spur-gear 23 which extends over it. Member 27 has a concentric bore of slightly larger diameter than the overall diameter of the spur-gear 23 so that the spur-gear 23 may be independently disposed therein, as shown in Fig. 3. The maximum diameter of member 27 is sufficiently less than the minimum diameter of the internal surface of the housing 18, to provide the necessary clearance for independent relative rotation. The internal surface of the housing 18 is formed with an internal helical gear 28. The diameter of the pitch circle of the internal gear 28 is twice that of the spur-gear 23 and, since the form and pitch of the two gears are identical, there are exactly twice as many teeth in the internal gear 28 as in the spur-gear 23, the construction in this respect being similar to that described with reference to Figs. 1 and 2.

Member 27 carries a plurality of groups (preferably three) of pinions arranged in symmetrical, planet-like formation about the spur-gear 23 and disposed in suitable apertures 29 provided in the comparatively thick shell of member 27 and having helical teeth of the same form and pitch as spur-gear 23 and internal gear 28. Each group of pinions comprises two identical pinions 30 and 31 having stub shafts 32 and 33, respectively, journaled in member 27 and relatively so located that the teeth of each pinion coact with the teeth of the spur-gear 23 and with the teeth of a third pinion 34 interposed between the two pinions 30 and 31 and in registration with the internal gear 28, as shown in Fig. 3. However, the pinion 34 of each set, unlike the pinions 30 and

31, is a floating pinion which has no stub shafts nor other direct connection with member 27, but is supported in operative position only by the teeth of the pinions 30 and 31 and of the internal gear 28. Thus, the pinion 34, when rotated by the internal gear 28, does not itself exert turning force on member 27 but transmits the rotative force to the pinions 30 and 31.

I have found that since each floating pinion 34 does not rotate about a fixed center but is supported solely by tooth contact with the pinions 30 and 31 and internal gear 28, it is preferable with this construction to have gear teeth rounded, and with such gears in helical form, as shown, I obtain a constant rolling contact of the coacting teeth and a smoother action in my differential.

The operation of this modified form of my differential will now be described, the entire range of operative action being divided as before into three cases.

*Case 1.*—When the tractability of road adherence of both wheels is equal, as when the vehicle is driven in a straight course on a hard surface road or when starting from rest on such a road, rotation in a counter-clockwise direction of the housing 18 thru the medium of the ring gear 17 causes the internal gear 28 to exert rotative force in the same direction on the "floating" pinion 34 which in turn has a tendency to rotate the pinions 30 and 31 in the opposite (clockwise) direction with resultant counter-clockwise effort on the spur-gear 23. However, since both vehicle wheels offer the same resistance to rotation, and thus the resistance on member 27 is equal to that on spur-gear 23, there can be no relative movement of the pinions 30, 31 and 34, member 27 or spur-gear 23, because the rotative forces acting in opposite directions are balanced, with the result that the pinions 30, 31 and 34 remain stationary and all parts of the differential mechanism are rotated as a unit in the same manner as explained in Case 1 of the operation of the construction illustrated in Figs. 1 and 2.

*Case 2.*—When the resistance offered by member 27 exceeds that offered by spur gear 23. Referring to the diagrammatic drawing Fig. 11a, and assuming that the resistance offered by member 27 is such that member 27 would ordinarily tend to remain at rest, while the housing 18 rotates in a counter-clockwise direction, the tendency would be, as has been shown before, for spur gear 23 to rotate in a counter-clockwise direction at twice the speed of housing 18, and pinion 30 would rotate in a clockwise direction. However, since pinion 34 is "floating" and thus has no direct connection with member 27, this "floating" pinion is crowded against the pinion 30 by the thrust of the teeth of the internal gear 28. This thrust on the "floating" pinion 34 has two direct results. First, a rolling thrusting and coupling effect is exerted between the housing 18 and the member 27 which carries the pinion 30, and this rolling coupling effect results in part in greater counter-clockwise rotative force being exerted on member 27. Second, designating the contacts between the housing 18 and the "floating" pinion 34 by A, the contact between "floating" pinion 34 and pinion 30 by B, the contact between pinion 30 and spur gear 23 by C, and the center of pinion 30 by E, respectively, since the pinion 34 is "floating" the force applied at A is transmitted across pinion 34 to the point B. This force has two tendencies, namely, a thrust against E in the direction BE and a second tendency to turn the pinion 30 in a clockwise direction by the force AB exerted on the crank arm EB. However, it will be apparent from the diagrammatic illustration in Fig. 11a, that the thrust against E is the greater of these two forces, that is to say that any slight resistance to the clockwise rotation of pinion 30 exerted by its contact with spur-gear 23 at the point C, will prevent the turning of the pinion 30 and cause a greater amount of the force AB to be expended in the direction BE. In other words, a greater force is exerted to push the member 27 in a counter-clockwise direction. But member 27 is the member in this case which offers the greater resistance.

*Case 3.*—Now let it be assumed that spur-gear 23 offers the greater resistance and that this resistance is sufficient ordinarily to cause the spur-gear 23 to tend to remain stationary while the housing 18 is rotated in a counter-clockwise direction. Referring to the diagrammatic drawing Fig. 11b, as has been previously explained, under such condition, the counter-clockwise rotation of the housing 18 would tend to cause member 27 to be rotated in the same counter-clockwise direction, but at double the speed of the housing 18, while spur-gear 23 remains stationary, and pinion 34 would be rotated in a clockwise direction and pinion 30 in a counter-clockwise direction. But this is not exactly what happens. As in the previous case, since the pinion 34 is "floating", the force is transmitted in the direction AB across the pinion. But this force AB is in opposition to the normal tendency, in this case, of the pinion 34 to rotate in a clockwise direction. Similarly, the rotation of pinion 34 in a clockwise direction causes pinion 30 to rotate in counter-clockwise direction. However, the force AB transmitted across pinion 34 to the point B has two tendencies, namely, a thrust in the direction BC and a thrust in the direction BE. The former tendency exerts a force in opposition to the normal rotation of the pinion 30 in a counter-clockwise direction. This force BC tends to resist the counter-clockwise rotation of pinion 30 and is mainly transmitted in the approximately straight line ABC across the pinions to the spur-gear 23 at the point C. Thus in this case a greater force is exerted on the member offering the greater resistance.

Similarly, it might be shown that rotation of the housing 18 in a clockwise direction would result, thru the "floating" pinion 34, in a greater rotative force being exerted either on member 27 or on spur-gear 23, in a clockwise direction, depending upon which member offered the greater resistance.

A further slight modification of the construction of my differential is illustrated in Figs. 7, 8 and 9. The helical spur-gear 23 is identical to that shown in Figs. 4 and 6. The housing 35 is provided with an internal helical gear 36 similar to that designated 28 in Fig. 3 and likewise of pitch diameter twice that of the spur-gear 23. The principal feature distinguishing this modification is the location of the planet pinions and in the manner in which they are disposed in the carrying member, the object of this alternative construction being to still further increase the proportional amount of the total rotative power transmitted to the driving element of the wheel having the greater tractive power. Fig. 7 shows a plurality of sets (preferably three) of pinions symmetrically arranged in planetary formation about the spur-gear 23, each set comprising three identical pinions 37, 38 and 39 disposed in suitable apertures in the shell of the member 40, the general form of which is similar to that of member 27 in Fig. 5. Each of the pinions 37 and 38 is provided with a pair of stub shafts such as shown at 41 and the pinions 39 are mounted on pins 43 journaled in holes 44 (Fig. 9) so disposed in member 40 that the helical teeth of the pinions 39 register with the teeth of the spur-gear 23. The stub shafts 41 of the pinions 37 and 38 are each journaled in bearing blocks 45 which are slideably disposed in recesses or pockets 46 so located in member 40 that the active teeth of the pinions 37 and 38 are in registration with the teeth of the pinions 39 and with the teeth of the internal gear 36, sufficient clearance being provided therebetween as to permit of a slight amount of movement of the pinions 37 and 38 and their bearing blocks in a direction radial to the internal gear 36. Because of these slideable mountings, the pinions 37 and 38 perform a similar function to that of the "floating" pinion 34 of the embodiment shown in Fig. 3, namely, to produce a rolling thrusting and coupling effect as heretofore described with reference to Case 2 of the said previous embodiment but with a greater degree of effectiveness due to the fact that two such pinions are provided in each set. Otherwise, the action of my differential mechanism with this modification is similar to that action already described.

Obviously, further modifications in my differential are possible without departing from the principles of my invention. It is not my intention to limit my invention to the exact construction of the pinions and associated elements as described. However, I have found it essential for the proper working of my device as a vehicle differential to have the number of the identical teeth of the internal driving gear twice that of those on the driven spur-gear as specified.

I claim:

1. A differential mechanism of the character described including a pair of axle shafts in axial alinement, a housing, an internal gear associated with the said housing and concentric with said axles, a pinion-carrying member rotatable within said housing and said internal gear and connected to one of said axles, a spur-gear rotatable within said member and connected to the other of said axles, the diameter of said spur-gear being one-half the diameter of the said internal gear, a plurality of sets of pinion gears in semi-planetary formation carried by said member, each of said sets including a pair of spaced pinions meshing with said spur-gear and a floating pinion adapted to mesh with both of said first mentioned pinions and with said internal gear.

2. In a differential mechanism of the character described a pair of axle shafts in axial alinement, an internal gear concentric with said axles, a pinion-carrying member rotatable within said internal gear and connected to one of said axles, a spur-gear rotatable within said member and connected to the other of said axles, the diameter of said spur-gear being one-half the diameter of the said internal gear, a plurality of sets of pinion gears in semi-planetary formation carried by said member, each of said sets including a pair of spaced pinions meshing with said internal gear and a pinion meshing with both of said first mentioned pinions and with said spur-gear.

3. A differential mechanism of the character described including a pair of axle shafts in axial alinement, a housing, an internal gear associated with the said housing and concentric with said axles, a pinion-carrying member rotatable within said housing and said internal gear and connected to one of said axles, a spur-gear rotatable within said member and connected to the other of said axles, the diameter of said spur-gear being one-half the diameter of the said internal gear, a plurality of sets of pinion gears in semi-planetary formation carried by said member, each of said sets including a pair of spaced slidably mounted pinions meshing with said internal gear and a pinion normally meshing with both of said first mentioned pinions and with said spur-gear.

4. In a differential mechanism of the character described, a pair of axle shafts in axial alinement, an internal gear concentric with said axles, a pinion-carrying member rotatable within said internal gear and connected to one of said axles, a spur-gear rotatable within said member and connected to the other of said axles, the teeth of said internal gear and said spur-gear being similar, but said internal gear having approximately twice as many teeth as said spur-gear, a pair of spaced pinions carried by said member and meshing with said spur-gear, and a pinion carried by said member and meshing with both of said first mentioned pinions and with said internal gear.

5. In a differential mechanism of the character described, a pair of axle shafts in axial alinement, an internal gear concentric with said axles, a pinion-carrying member rotatable within said internal gear and connected to one of said axles, a spur-gear rotatable within said member and connected to the other of said axles, the teeth of said internal gear and said spur-gear being similar but said internal gear having approximately twice as many teeth as said spur-gear, a plurality of sets of pinion gears in semi-planetary formation carried by said member, each of said sets including a pair of spaced pinions meshing with said spur-gear and a pinion adapted to mesh with both of said first mentioned pinions and with said internal gear.

6. In a differential mechanism of the character described, a pair of axle shafts in axial alinement, an internal gear concentric with said axles, a pinion-carrying member rotatable within said internal gear and connected to one of said axles, a spur-gear rotatable within said member and connected to the other of said axles, a plurality of sets of pinion gears in semi-planetary formation carried by said member, each of said sets including a pair of spaced pinions meshing with said spur-gear and a pinion adapted to mesh with both of said first mentioned pinions and with said internal gear, said internal gear, pinions, and spur-gear comprising helical gears of the same formation and pitch, and said internal gear having twice as many teeth as said spur-gear.

7. In a differential mechanism of the character described, a pair of axle shafts in axial alinement, an internal gear concentric with said axles, a pinion-carrying member rotatable within said internal gear and connected to one of said axles, a spur-gear rotatable within said member and connected to the other of said axles, the diameter of said spur-gear being one-half the diameter of said internal gear, a pair of slidably-mounted pinion gears carried by said member, said slidably-mounted gears spaced from each other but both meshing with said internal gear, and a third pinion carried by said member meshing with said spur-gear and normally meshing with both of said slidably mounted gears.

8. In a differential mechanism of the character described, a pair of axle shafts in axial alinement, an internal gear concentric with said axles, a pinion-carrying member rotatable within said internal gear and connected to one of said axles, a spur-gear rotatable within said member and connected to the other of said axles, a pair of spaced pinions carried by said member and meshing with said spur-gear, and a floating pinion adapted to mesh with both of said first mentioned pinions and with said internal gear.

9. In a differential mechanism of the character described, a pair of axle shafts in axial alinement, an internal gear concentric with said axles, a member rotatable within said internal gear and connected to one of said axles, a spur-gear rotatable within said member and connected to the other of said axles, the diameter of said spur-gear being one-half the diameter of said internal gear, said internal gear and said spur-gear connected by a set of gears in semi-planetary formation carried by said member, said set comprising a pair of spaced pinion gears and a floating gear normally meshing with both of said pinion gears.

10. In a differential mechanism of the character described, a pair of axle shafts in axial alinement, and internal gear concentric with said axles, a member rotatable within said internal gear and connected to one of said axles, a spur-gear rotatable within said member and connected to the other of said axles, the diameter of said spur-gear being one-half the diameter of said internal gear, a pair of slidably-mounted pinion gears carried by said member, said slidably-mounted gears spaced from each other but both meshing with said spur-gear, and a floating pinion meshing with said internal gear and normally meshing with both of said slidably mounted gears.

11. In a differential mechanism of the character described, a pair of axle shafts in axial alinement, an internal gear concentric with said axles, a member rotatable within said internal gear and connected to one of said axles, a spur-gear rotatable within said member and connected to the other of said axles, the diameter of said spur-gear being one-half the diameter of said internal gear, a pair of slidably-mounted pinion gears carried by said member, said slidably-mounted gears spaced from each other but both meshing with said internal gear, and a floating pinion meshing with said spur-gear and normally meshing with both of said slidably mounted gears.

12. In a differential mechanism of the character described, a pair of axle shafts in axial alinement, an internal gear concentric with said axles, a member rotatable within said internal gear and connected to one of said axles, a spur-gear rotatable within said member and connected to the other of said axles, the teeth of said internal gear and of said spur-gear being similar but said internal gear having twice as many teeth as said spur-gear, a pair of spaced pinions carried by said member and meshing with said internal gear, and a floating pinion adapted to mesh with both of said first mentioned pinions and with said spur-gear.

13. In a differential mechanism of the character described, a pair of axle shafts in axial alinement, an internal gear concentric with said axles, a pinion-carrying member rotatable within said internal gear and connected to one of said axles, a spur gear rotatable within said member and connected to the other of said axles, the diameter of said spur gear being one-half the diameter of said internal gear, a pair of slidably-mounted pinion gears carried by said member, said slidably-mounted gears spaced from each other but both meshing with said spur-gear, and a third pinion meshing with said internal gear and normally meshing with both of said slidably mounted gears.

14. In a differential mechanism of the character described, a pair of axle shafts in axial alinement, an internal gear concentric with said axles, a member rotatable within said internal gear and connected to one of said axles, a spur-gear rotatable within said member and connected to the other of said axles, the teeth of said internal gear and of said spur-gear being similar but said internal gear having twice as many teeth as said spur-gear, said internal gear and said spur-gear connected by a set of gears in semi-planetary formation carried by said member, said set comprising a pair of spaced, slidably mounted gears and a third pinion gear normally meshing with both of said slidably mounted gears.

15. In a differential mechanism of the character described, a pair of axle shafts in axial alinement, an internal gear concentric with said axles, a member rotatable within said internal gear and connected to one of said axles, a spur-gear rotatable within said member and connected to the other of said axles, the teeth of said internal gear and of said spur-gear being similar but said internal gear having twice as many teeth as said spur-gear, a plurality of sets of slidably mounted pinion gears in semi-planetary formation carried by said member, each of said sets including a slidably mounted pinion meshing with said internal gear and a second slidably mounted pinion meshing with said first mentioned pinion and with said spur-gear.

16. In a differential mechanism, a driving member having an internal gear, a pair of axle shafts in axial alinement and concentric with said internal gear, an intermediate member rotatable within said driving member and connected to one of said axles, a spur-gear rotatable within said intermediate member and connected to the other of said axles, a plurality of sets of pinion gears in semi-planetary formation carried by said intermediate member, each of said sets including a pinion-gear meshing with said spur-gear and a second pinion meshing with said first mentioned pinion and with said internal gear, the diameter of said spur-gear being one-half the diameter of said internal gear, and the number of teeth on said spur-gear accordingly being one-half the number of teeth on the internal gear, whereby rotation of said driving member will cause equal torque to be applied to said axle shafts.

FERDINAND W. SEECK.